United States Patent [19]

Wei et al.

[11] Patent Number: 4,986,886

[45] Date of Patent: Jan. 22, 1991

[54] POLYMERIZATION OF THIOPHENE AND ITS DERIVATIVES

[75] Inventors: Yen Wei, Philadelphia; Guang-Way Jang, Upper Darby; Chi-Cheung Chan, Philadelphia, all of Pa.

[73] Assignee: Drexel University, Philadelphia, Pa.

[21] Appl. No.: 530,377

[22] Filed: May 30, 1990

[51] Int. Cl.$^5$ .............................................. C25B 3/02
[52] U.S. Cl. ................................... 204/78; 204/59 R; 526/256
[58] Field of Search ................ 204/59 R, 78; 526/256

[56] References Cited

U.S. PATENT DOCUMENTS

| | | | |
|---|---|---|---|
| 3,557,068 | 1/1971 | Huber | 526/256 |
| 4,599,194 | 7/1986 | Frommer et al. | 252/518 |
| 4,657,985 | 4/1987 | Dray et al. | 525/390 |
| 4,707,527 | 11/1987 | Dray et al. | 525/417 |

OTHER PUBLICATIONS

K. Tamao et al., *Tetrahedron*, "Nickel-Phosphine Complex-Catalyzed Grignard Coupling-II", 38 (22), pp. 3347-3354 (1982).

Gerard Tourillon, *Handbook of Conducting Polymers*, "Polythiophene and Its Derivatives", T. A. Skotheim, Ed., Marcel Dekker, NY, 1, pp. 293-350, (1986).

*Primary Examiner*—John F. Niebling
*Assistant Examiner*—Steven P. Marquis
*Attorney, Agent, or Firm*—Panitch Schwarze, Jacobs & Nadel

[57] ABSTRACT

Electrically conductive polythiophene and its derivatives are prepared by polymerizing compounds of the formula:

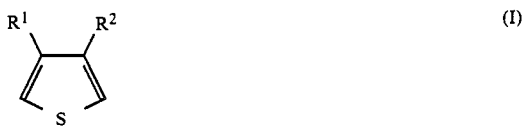

wherein $R^1$ and $R^2$ are independently hydrogen, $R^3$, $-OR^3$ or $-SR^3$; and $R^3$ is aryl of 6 to 12 carbons or aliphatic of 1 to 12 carbons; comprising reacting the compound of formula I in the presence of an initiator, the initiator comprising a 2-substituted thiophene nucleus which has a lower oxidation potential than the compound of formula I and which is capable of being incorporated into the polymer resulting from the polymerization reaction; a chemical oxidant or an applied electrochemical potential; and a non-aqueous organic solvent.

31 Claims, 1 Drawing Sheet

POLYMERIZATION OF THIOPHENE AND ITS DERIVATIVES

CROSS-REFERENCE TO RELATED APPLICATION

This application is related to our copending application Ser. No. 269,857, filed Nov. 10, 1988, now U.S. Pat. No. 4,940,517 entitled "Polymerization of Aniline and its Derivatives".

FIELD OF THE INVENTION

The present invention relates to the chemical and electrochemical preparation of polythiophene and its substituted derivatives. More particularly, the invention relates to improved methods for polymerizing thiophene and its derivatives in a more cost-effective and energy-efficient manner, as well as the resulting polythiophenes and polythiophene derivatives having improved properties, such as increased smoothness and/or uniformity of the electrochemically prepared polymer films.

BACKGROUND OF THE INVENTION

In recent years, polythiophene and its derivatives have received increasing attention as an important class of electrically conducting polymers for their potential commercial and military applications in advanced materials, for example, electroactive, optical, anti-corrosion, electromagnetic-shielding and biomedical materials, and in construction of new types of other electronic materials, for example, microelectrodes, batteries, sensors and electronic devices.

Polythiophene and its derivatives can be prepared by (i) chemical or (ii) electrochemical oxidation of thiophene and its derivatives as represented by the following equation:

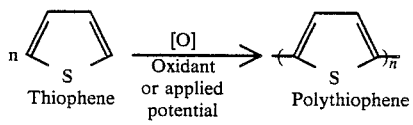

The published literature and patents describe a number of methods for preparing polythiophene.

The electrochemical polymerization of thiophene generally requires a high applied potential of at least about 1.6 volts (V) versus (vs.) saturated calomel electrode (SCE) in comparison with the relatively low applied potentials required for the preparation of polyaniline and polypyrrole (about 0.7 or 0.8 V vs. SCE). However, the polythiophene polymers so prepared decompose readily at high potentials, often resulting in substandard quality of the polymers. Moreover, the processes disclosed in the scientific literature and previous patents for electrochemically polymerizing thiophene generally provide reactions having slow reaction rates.

Chemical preparation of polythiophene and its derivatives is usually carried out via a polycondensation of 2,5-dihalothiophenes by dehalogenation with magnesium in the presence of transition metal catalysts. The chemical synthesis involves multi-step reactions and is generally economically inefficient and time-consuming. In addition, the polythiophenes prepared via chemical synthetic methods generally have lower conductivities, for example, about $10^{-2}$ to about 10 Siemens per centimeter (S/cm), as compared to polythiophenes prepared electrochemically (about $10^2$ S/cm).

In addition, most of the previous work in the field of polythiophenes has been devoted to the study of the physicochemical and electrical properties of the polymers and to the study of new monomers. However, the chemistry of the polymerization of thiophene and its derivatives has received little attention. Moreover, none of the previous methods for the synthesis of electrically conducting polythiophene and its derivatives involves using organic initiators as in the present invention.

Accordingly, higher yielding and more effective cost and energy efficient methods of producing polythiophene and its derivatives are needed.

BRIEF SUMMARY OF THE INVENTION

One aspect of the invention relates to a method for polymerizing a compound having the following formula:

wherein $R^1$ and $R^2$ are independently hydrogen, $R^3$, $-OR^3$ or $-SR^3$; and $R^3$ is aryl of 6 to 12 carbons or aliphatic of 1 to 12 carbons, comprising reacting the compound of formula I in the presence of (a) an initiator, the initiator comprising a 2-substituted thiophene nucleus which has a lower oxidation potential than the compound of formula I and which is capable of being incorporated into the polymer resulting from the polymerization reaction; (b) a chemical oxidant or an applied electrochemical potential; and (c) a non-aqueous organic solvent.

Preferably, the initiator is a compound having the following formula:

wherein $R^4$ is hydrogen, $R^5$, $-OR^5$ or $-SR^5$; $R^5$ is aryl of 6 to 12 carbons, aliphatic of 1 to 12 carbons or a polymeric residue; and x is 0, 1 or 2, with the proviso that when $R^4$ is hydrogen, x is not 0.

The invention is particularly useful for polymerizing thiophene in the presence of an initiator comprising a 2-substituted thiophene nucleus, such as 2,2'-bithiophene, which is incorporated in the resulting electrically conductive polythiophene.

DETAILED DESCRIPTION OF THE PREFERRED EMBODIMENTS

Figure 1:
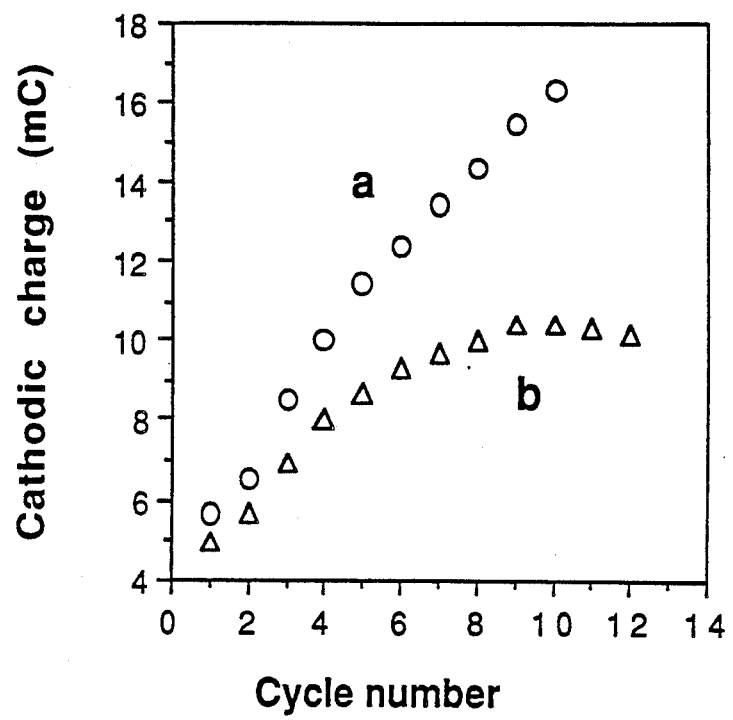

The methods of the present invention are applicable to both the chemical and electrochemical synthesis of electrically conducting polythiophene and its derivatives. Generally, the methods may be carried out in essentially the same manner as conventional or other known prior art methods of polymerizing thiophene and its derivatives, except that according to the present invention, an initiator comprising a 2-substituted thiophene nucleus is included in the reaction mixture.

As a result of incorporating the initiator in the reactions according to the present invention, the rates of polymerization are greatly increased, the cost effectiveness and energy efficiency of the polymerization are increased, structural defects in the polymers are reduced, the polymers prepared are more uniform, the choice of oxidants and monomers is broadened, lower potentials are required in the electrochemical syntheses, and qualities of the polymers including electrical conductivities are improved.

In general, the methods of the present invention are more cost effective and energy efficient and result in the preparation of higher quality electrically conducting polythiophene and its derivatives. For example, the present invention provides a highly cost-effective method for preparing poly(unsubstituted-thiophene) utilizing a very inexpensive industrial chemical, thiophene, as the monomer. In stark contrast, according to conventional methods, an unsubstituted polythiophene can generally only be produced from much more expensive monomers, for example, 2,2'-bithiophene or 2,2':5'2''-terthiophene. Given present market conditions, these latter two reagents are roughly about 250 to about 1300 times more expensive on a unit cost basis than thiophene.

As indicated above, the methods of the present invention are applicable to the polymerization of compounds (monomers) of the following formula I:

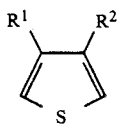
(I)

wherein $R^1$ and $R^2$ are independently hydrogen, $R^3$, —$OR^3$ or —$SR^3$; and $R^3$ is aryl of 6 to 12 carbons or aliphatic of 1 to 12 carbons. Other similar thiophene compounds which may be polymerized according to the methods of the present invention will be apparent to those skilled in the art. Preferably, $R^1$ is hydrogen and $R^2$ is hydrogen, methyl or n-pentyl.

The present invention also includes the copolymerization of two or more different monomers of formula I or the copolymerization of two or more different monomers of formula I with one or more other monomers, such as substituted or unsubstituted aniline and pyrrole monomers, to produce other electrically conductive polymers Such copolymers may include polypyrroles, polyfurans, polyanilines and the like, as exemplified in European Published Application No. 85.112972.

While the inventors do not wish to be bound by any particular theory or theories, it appears that the initial oxidation of thiophene monomer and thiophene monomer derivative to bithiophene and bithiophene derivative, generally referred to as the nucleation process, is the rate-determining step in the polymerization of thiophene and thiophene derivatives. This nucleation process for thiophene may be depicted as follows:

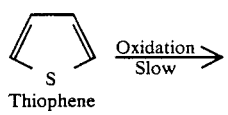

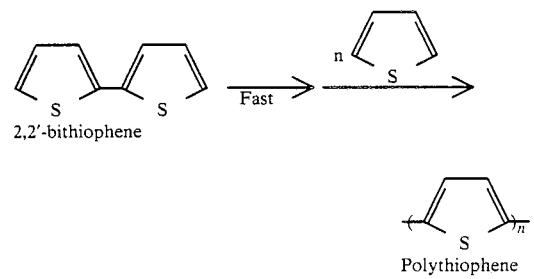

Since the oxidation potentials of 2,2'-bithiophene and other oligomers of thiophene and its derivatives are lower than the oxidation potentials of thiophene monomers, the bithiophene and other oligomers of thiophene and its derivatives in the polymerization reaction should be oxidized first, leading to nucleation species upon which the polymer grows. Therefore, the number of the nucleation species would increase in the polymerization reactions with the intentional addition of 2,2'-bithiophene and other oligomers of thiophene and its derivatives. This may explain the higher overall rate of polymerization and more uniform polymer films of polythiophene and its derivatives obtained according to the methods of the present invention.

In accordance with the present invention, the concentration of the compound of formula I in the organic solvent for the reaction to polymerize the compound of formula I is in the range of about 0.05 molar (M) to about 3M or more, with the range of about 0.1M to about 1M being more preferred.

With both the chemical and electrochemical oxidation methods according to the present invention, the advantages of the invention are obtained by using an initiator to initiate the polymerization of thiophene or its derivatives. The initiator to be useful in the present invention must have two properties: (i) a lower oxidation potential than the thiophene monomer or other thiophene derivative to be polymerized; and (ii) the capability of being incorporated into the polymer chain (i.e., as an integral part of the structural backbone) of the polymer resulting from the polymerization reaction.

As indicated above, the initiators useful in the present invention preferably comprise a compound having the following formula:

$$R^4\text{–}\underset{S}{\underbrace{\phantom{XX}}}\text{–}\underset{x}{\phantom{X}}\text{–}\underset{S}{\underbrace{\phantom{XX}}} \quad (II)$$

wherein $R^4$ is hydrogen, $R^5$, —$OR^5$ or —$SR^5$; $R^5$ is aryl of 6 to 12 carbons, aliphatic of 1 to 12 carbons or a polymeric residue; and x is 0, 1 or 2, with the proviso that when $R^4$ is hydrogen, x is not 0.

Preferably, the $R^5$ polymeric residue is a polyamide, a polyester, a polyether, a polyurethane or a vinyl polymer. In accordance with the present invention, the thiophene nucleus and/or thiophene nuclei in the initiator may be present as pendant groups or as end groups in the polymer chain of the $R^5$ polymer residue.

Preferably, $R^4$ is hydrogen and x is 1 or 2, and more preferably, $R^4$ is hydrogen and x is 1.

Particularly preferred thiophene initiators for use in the present invention include the dimeric species and other oligomers of thiophene (or its derivatives) resulting from radical coupling of the thiophene radical cation. For example, the most common (and relatively inexpensive, commercially available) dimeric form of thiophene is 2,2'-bithiophene. A suitable trimeric species which may be used is 2,2':5',2''-terthiophene, also commercially available. Other similar compounds comprising a thiophene nucleus which may be used as an initiator in the polymerization of the compound of formula I will be apparent to those skilled in the art. For example, other suitable thiophene initiators useful in the present invention include higher oligomers of thiophene and its derivatives.

The present invention also includes polymerizing a compound of formula I in the presence of two or more different initiators.

In accordance with the present invention, the concentration of the initiator is in the range of about 0.05 to about 10 mole percent of the compound of formula I used in the reaction with the range of about 0.1 to about 2 mole percent being more preferred.

In the case of polymerization of thiophene and its derivatives by chemical oxidation, the methods of the present invention may use any of a number of conventional or unconventional oxidants or oxidizing agents. Generally, it is only required that the oxidant oxidize the compound of formula I and that the oxidant is soluble in the organic solvent used in the polymerization reaction.

Generally, it is preferred that the oxidant is a metal perchlorate salt or a metal halide. Examples of suitable oxidants include iron (III) perchlorate ($Fe(ClO_4)_3$), copper (II) perchlorate ($Cu(ClO_4)_2$), $MoCl_5$, $RuCl_3$, $FeCl_3$, $AlCl_3$, $CuCl_2$ and $AsF_5$. Preferably, the oxidant comprises iron (III) perchlorate or $FeCl_3$. Other suitable oxidizing agents, in addition to those exemplified above, will be apparent in view of the present disclosure.

The molar ratio of oxidant to the compound of formula I (monomer) is preferably in the range of about 0.1:1 to about 10:1 with the range of about 1:1 to about 2:1 being more preferred.

In the case of electrochemical polymerization of thiophene and its derivatives, the reaction is preferably conducted in the presence of an electrolyte. Generally, it is only required that the electrolyte support electrochemical polymerization of the compound of formula I and that the electrolyte is soluble in the organic solvent used in the polymerization reaction.

In accordance with the present invention, the electrolytes suitable for use in the electrochemical polymerization of thiophene and its derivatives are those electrolytes typically used in electrochemical reactions and generally include organic and inorganic salts. Examples of suitable electrolytes include $LiClO_4$, $Bu_4NClO_4$, $Et_4NBF_4$, $Bu_4NPF_6$, $Et_4NPF_6$, $Bu_4NBF_4$, $LiCF_3SO_3$, $Bu_4NSO_3CF_3$, $LiBF_4$, $AgClO_4$, $Bu_4NI$, $LiAsF_6$ and trifluoroborate diethyl ether. Preferably, the electrolyte comprises $LiClO_4$. However, other suitable electrolytes, in addition to those exemplified above, will be apparent in view of the present disclosure.

In accordance with the present invention, the concentration of the electrolyte is preferably in the range of about 0.01M to about 3M or more with a concentration of about 0.1M to about 1M being more preferred.

In the case of electrochemical polymerization of thiophene and its derivatives, the electric potential is generally applied using cyclic potential sweep techniques, potentiostat techniques or galvanostat techniques. Generally, a platinum electrode is used for plating out the polythiophene and its derivatives and the potential is applied against a saturated calomel electrode (SCE). However, other suitable electrolytic methods and apparatus for carrying out the present invention will be evident to those skilled in the art.

In the method of the present invention, the up-limit potential may range from about 1.3 V to more than about 2 V vs. SCE. Preferably, an up-limit potential of about 1.3 V to about 1.8 V vs. SCE may be used in the present invention. In the cyclic potential sweep technique, the rate of potential sweep may range from about 25 to more than about 300 millivolts per second (mV/sec). Preferably, the rate of potential sweep in the cyclic potential sweep technique in the present invention is about 50 to about 100 mV/sec.

In accordance with the present invention, the polymerization of the compound of formula I is conducted in a non-aqueous organic solvent Generally, a suitable solvent to be used in the methods according to the present invention is one in which either chemical or electrochemical polymerization of the compound of formula I can be conducted. In addition, in the case of electrochemical polymerization, the solvent must be one which does not oxidize under the electrochemical polymerization conditions.

Examples of solvents suitable for chemical or electrochemical polymerization according to the present invention include acetonitrile ($CH_3CN$), nitrobenzene, propylene carbonate, tetrahydrofuran (THF), nitromethane, benzonitrile, N-methyl-2-pyrrolidone (NMP), dimethylformamide (DMF), low molecular weight polymers, for example, polyethylene glycol, and mixtures thereof. Liquid sulfur dioxide is also an example of a solvent suitable for chemical or electrochemical polymerization according to the present invention. Other suitable solvents to be used in the methods according to the present invention will be readily apparent to one skilled in the art based upon the present disclosure.

As with prior art methods, the polymerization of thiophene and its derivatives is preferably carried out at atmospheric pressure in air or under an inert gas atmosphere, for example, an argon or nitrogen atmosphere. The temperature range of the chemical or electrochemical polymerization is very broad and not particularly critical, depending upon the solvents used, as long as it does not exceed the boiling point of the solvent or fall below the melting point of the solvent. A preferable temperature range is about $-40°$ C. to about $50°$ C. with a temperature range of about $0°$ C. to about room temperature being more preferred. It will be apparent to one skilled in the art, however, that with some organic solvents, the temperature could be lower. Generally, the higher the temperature, the greater the rate of reaction, including undesirable side reactions.

In accordance with the present invention, the reactions for polymerizing the compound of formula I are conducted for a time to polymerize substantially all of the monomer present in the reaction. In the case of chemical polymerization of the compound of formula I, a preferable reaction time is about 4 hours to about 6 hours. In the case of electrochemical polymerization, a preferable reaction time range is about 0.5 hour to about 6 hours. However, it will be apparent to one skilled in the art that depending upon the compound of formula I, the initiator, the oxidant and the solvent used, the reaction times may be shorter or longer.

Perhaps most importantly, the methods of the present invention result in considerably increased polymerization rates and polymer yields. This results in highly cost-effective and energy efficient methods for polymerizing thiophene and its derivatives.

The invention will now be illustrated in more detail with reference to the following specific, non-limiting examples:

CHEMICAL SYNTHESIS OF POLY(3-METHYLTHIOPHENE)

Example I 1.0 milliliter (ml) of a 0.008 molar (M) solution of 2,2'-bithiophene in acetonitrile ($CH_3CN$) was added to 40 ml of a 0.2M solution of 3-methylthiophene in $CH_3CN$. The resulting solution was cooled to about 0° to about 5° C. in an ice-water bath. 40 ml of a 0.6M solution of $Fe(ClO_4)_3$ in $CH_3CN$, precooled to about 0° to about 5° C., was added dropwise with vigorous stirring during a period of about 30 minutes. The resulting solution darkened immediately and became brownish-black in color as a precipitate formed. The reaction mixture was stirred an additional 6 hours. The precipitate was collected and washed with about 300 to about 400 ml of methanol until the filtrate became colorless. After drying under vacuum for 20 hours, a brownish-black product (0.37 grams (g)) was obtained.

The conductivity of poly(3-methylthiophene) prepared in this example was determined to be about 30 S/cm by the standard four-probe technique. In contrast, the conductivity of poly(3-methylthiophene) prepared by the conventional polycondensation of 2,5-dihalo-3-methylthiophene was less than 10 S/cm. See G. Tourillon, *Handbook of Conducting Polymers*, T. A. Skotheim, Ed., Marcel Dekker, N.Y., Vol. 1, p. 293 (1986).

Example IA

Example I was repeated except that 2,2':5',2''-terthiophene was used as an intiator, the reaction time was varied and 40 ml of a 0.3M $Fe(ClO_4)_3/CH_3CN$ solution was used, providing a molar ratio of oxidant to monomer of 1.5:1. The results of Examples I and IA and a comparison of 2,2':5',2''-terthiophene to 2,2'-bithiophene as initiators are summarized in the following Table I:

TABLE I

| | Initiator and Yield | | |
|---|---|---|---|
| Reaction Time (hr.) | None Yield (g) | 0.1% Bithiophene* Yield (g) | 0.07% Terthiophene* Yield (g) |
| 2 | 0.0255 | 0.0482 | 0.0561 |
| 4 | 0.0480 | 0.0704 | 0.0843 |
| 6 | 0.0529 | 0.0720 | 0.0833 |
| 8 | 0.0555 | 0.0722 | 0.0821 |

*Molar percentage of initiator to monomer.

Table I demonstrates that in the presence of a small amount of 2,2'-bithiophene or 2,2':5',2''-terthiophene, the yield of the polymer increases significantly and an increase in the reaction time from 2 to 4 hours greatly increases the yield of the polymer. However, further increases in the reaction time have less effect on the yield.

Example IB

Example I was repeated except unsubstituted thiophene was used as the monomer and the molar ratios of oxidant to monomer and initiator to monomer were 5 to 1 and 0.01 to 1, respectively. A black-brownish poly(unsubstituted thiophene) (0.14 g) was obtained. As a comparison, the experiment was also carried out under the identical conditions except that the initiator, 2,2'-bithiophene, was absent. Only 0.096 g of the polymer was isolated.

ELECTROCHEMICAL SYNTHESIS OF POLYTHIOPHENES

Electrochemical syntheses and cyclic voltammetry were performed on an EG&G PAR Model 273 potentiostat/galvanostat. A 3-electrode cell was used with a saturated calomel electrode (SCE) as reference and platinum foils as working and counter electrodes. Polythiophene, poly(3-methylthiophene), poly(3-n-pentylthiophene) and poly(2,2'-bithiophene) films were deposited on the working electrode having a surface area of 3 $cm^2$ in a 0.1 M $LiClO_4/CH_3CN$ electrolyte containing the appropriate monomers and with or without 2,2'-bithiophene using cyclic potential sweep or potentiostat techniques at room temperature.

Example II

3-Methylthiophene, 2,2'-bithiophene and $LiClO_4$ were combined in $CH_3CN$ at concentrations of 0.2M, 0.2 mM and 0.1M, respectively. The electrical potential sweep range was between −0.2 and 1.6 V vs. SCE at a scan rate of 100 mV/sec. The cyclic voltammograms of the polymerization were recorded continuously and coincidentally with the synthesis. The cathodic charges that were measured from the cyclic voltammograms represent the amount of the polymer formed on the electrode. Therefore, the cathodic charges were used to monitor the rate of the polymer formation. The cathodic charges were found to increase greatly with the reaction time, indicating a fast rate of polymer formation.

In contrast, when the electrochemical polymerization was carried out under the identical conditions except that only 3-methylthiophene or 2,2'-bithiophene was present, the rate of the increase in the cathodic charges was substantially slower. For instance, at the 25th potential cycle, the amount of polymer produced in the system with both 3-methylthiophene and 2,2'-bithiophene was about 10 times more than that in the system with only 2,2'-bithiophene and about 5 times more than that in the system with only 3-methylthiophene.

Poly(3-methylthiophene), prepared in the absence of 2,2'-bithiophene, gave discontinuous and irregular microislands which may reflect the slow nucleation and initial growth of the polymer. However, poly(3-methylthiophene), prepared in the presence of 2,2'-bithiophene, appeared more uniform. The uniformity of the film was close to that of poly(2,2'-bithiophene) film.

Example IIA

Example II was repeated except unsubstituted thiophene (0.2M) was used as monomer and the potential sweep range was −0.2 to 2.0 V vs. SCE. The rate of polythiophene formation in the presence of 2,2'-bithiophene increased by about 50 to about 70% in comparison to that in the absence of 2,2'-bithiophene. Both adhesion of the polythiophene film to the electrode and the uniformity of the film were also improved significantly when the initiator, 2,2'-bithiophene, was present in the electrochemical polymerization system.

9

When the polymerization of unsubstituted thiophene was conducted in the presence of 2,2'-bithiophene and the potential sweep range was −0.2 to 1.8 V vs. SCE, an appreciable amount of polythiophene formed after ½ hour. In contrast, when the polymerization of unsubstituted thiophene was conducted in the absence of 2,2'-bithiophene and the potential sweep range was −0.2 to 1.8 V vs. SCE, no polythiophene was observed on the working electrode after 6 hours. Plots of the cathodic charge, representing the amount of polymer deposited on the working electrode against the number of cycles (i.e., reaction time), are shown in the graph of FIG. 1, wherein the polymerization was conducted (a) in the presence of 2,2'-bithiophene (0.2 mM) and (b) in the absence of 2,2'-bithiophene.

Example III

The monomer, 3-n-pentylthiophene, was prepared according to Tomao's procedure and purified by distillation under reduced pressure. See K. Tomao et al., *Tetrahedron,* 38, p. 22 (1982). 3-N-Pentylthiophene, 2,2'-bithiophene and LiClO₄ were combined in CH₃CN at concentrations of 0.2M, 0.2 mM and 0.1M, respectively. The potential sweep ranges were between −0.2 and 1.5 V vs. SCE. polymerization of 3-n-pentylthiophene, with the addition of 2,2'-bithiophene, had a shorter induction period and a higher rate of polymer growth than without 2,2'-bithiophene.

Example IIIA

Poly(3-n-pentylthiophene) was prepared following the same procedure as described in Example III except the applied potential was held constant at 1.3 or 1.4 V vs. SCE throughout the entire polymerization. In the absence of 2,2'-bithiophene as an initiator, no polymer formation was observed on the surface of the working electrode after holding the potential at 1.3 or 1.4 V vs. SCE for more than 1 hour. In the presence of 2,2'-bithiophene, polymer formation on the electrode was observed within a few minutes.

The present invention may be embodied in other specific forms without departing from the spirit or the essential attributes thereof and, accordingly, reference should be made to the apended claims, rather than to the foregoing specification as indicating the scope of the invention.

We claim:

1. A method for polymerizing a compound having the following formula:

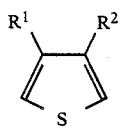

(I)

wherein $R^1$ and $R^2$ are independently hydrogen, $R^3$, $-OR^3$ or $-SR^3$; and $R^3$ is aryl of 6 to 12 carbons or aliphatic of 1 to 12 carbons, comprising reacting the compound of formula I in the presence of:

a an initiator, the initiator comprising a 2-substituted thiophene nucleus which has a lower oxidation potential than the compound of formula I and which is capable of being incorporated into the polymer resulting from the polymerization reaction;

10 b. a chemical oxidant or an applied electrochemical potential; and
c. a non-aqueous organic solvent.

2. The method according to claim 1 wherein $R^1$ is hydrogen and $R^2$ is hydrogen, methyl or n-pentyl.

3. The method according to claim 1 wherein the initiator is a compound having the following formula:

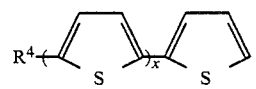

(II)

wherein
$R^4$ is hydrogen, $R^5$, $-OR^5$ or $-SR^5$;
$R^5$ is aryl of 6 to 12 carbons, aliphatic of 1 to 12 carbons or a polymeric residue; and
x is 0, 1 or 2, with the proviso that when $R^4$ is hydrogen, x is not 0.

4. The method according to claim 3 wherein the polymeric residue is a polyamide, a polyester, a polyether, a polyurethane or a vinyl polymer.

5. The method according to claim 3 wherein $R^4$ is hydrogen and x is 1 or 2.

6. The method according to claim 3 wherein $R^4$ is hydrogen and x is 1.

7. The method according to claim 1 wherein the oxidant oxidizes the compound of formula I and is soluble in the organic solvent.

8. The method according to claim 7 wherein the oxidant is selected from the group consisting of a metal perchlorate salt and a metal halide.

9. The method according to claim 7 wherein the oxidant is selected from the group consisting of iron (III) perchlorate, copper (II) perchlorate, $MoCl_5$, $RuCl_3$, $FeCl_3$, $AlCl_3$, $CuCl_2$ and $AsF_5$.

10. The method according to claim 7 wherein the oxidant comprises iron (III) perchlorate or $FeCl_3$.

11. The method according to claim 1 wherein the reaction is conducted in the presence of an electrolyte.

12. The method according to claim 11 wherein the electrolyte supports electrochemical polymerization of the compound of formula I and is soluble in the organic solvent.

13. The method aCCOrding to claim 11 wherein the electrolyte is selected from the group consisting of LiClO₄, Bu₄NClO₄, Et₄NBF₄, Bu₄NPF₆, Et₄NPF₆, Bu₄NBF₄, LiCF₃SO₃, Bu₄NSO₃CF₃, LiBF₄, AgClO₄, Bu₄NI, LiAsF₆ and trifluoroborate diethyl ether.

14. The method according to claim 11 wherein the electrolyte comprises LiClO₄.

15. The method according to claim 1 wherein the electrochemical potential is applied by a cyclic potential sweep technique, a potentiostat technique or a galvanostat technique.

16. The method according to claim 1 wherein the solvent supports electrochemical polymerization of the compound of formula I and the solvent does not oxidize.

17. The method according to claim 16 wherein the solvent is selected from the group consisting of acetonitrile, nitrobenzene, propylene carbonate, tetrahydrofuran, nitromethane, benzonitrile, N-methyl-2-pyrrolidone, dimethylformamide, low molecular weight polymers and liquid sulfur dioxide.

18. The method according to claim 1 wherein the concentration of the compound of formula I is about 0.05M to about 3M.

19. The method according to claim 1 wherein the concentration of the compound of formula I is about 0.1M to about 1M.

20. The method according to claim 1 wherein the concentration of the initiator is about 0.05 to about 10 mole percent of the compound of formula I used in the reaction.

21. The method according to claim 1 wherein the concentration of the initiator is about 0.1 to about 2 mole percent of the compound of formula I used in the reaction.

22. The method according to claim 1 wherein the molar ratio of the oxidant to the compound of formula I is about 0.1:1 to about 10:1.

23. The method according to claim 22 wherein the molar ratio of the oxidant to the compound of formula I is about 1:1 to about 2:1.

24. The method according to claim 11 wherein the concentration of the electrolyte is about 0.01M to about 3M.

25. The method according to claim 11 wherein the concentration of the electrolyte is about 0.1M to about 1M.

26. The method according to claim 1 wherein the reaction is conducted at about −40° C. to about 50° C.

27. The method according to claim 1 wherein the reaction is conducted at about 0° C. to about room temperature.

28. The method according to claim 1 wherein the chemical polymerization is conducted for about 4 hours to about 6 hours.

29. The method according to claim 1 wherein the electrochemical polymerization is conducted for about 0.5 hour to about 6 hours.

30. In a method of preparing polythiophene comprising reacting thiophene in an organic solvent with a chemical oxidizing agent, the improvement comprising polymerizing thiophene in the presence of an initiator, the initiator comprising a 2-substituted thiophene nucleus which has a lower oxidation potential than thiophene and which is capable of being incorporated into the polymer resulting from the polymerization reaction.

31. In a method of preparing polythiophene electrochemically comprising reacting thiophene in an organic solvent by applying an electrochemical potential between a platinum electrode and a saturated calomel electrode in the solvent, and plating the polythiophene on the platinum electrode, the improvement comprising adding to the solvent an initiator, the initiator comprising a 2-substituted thiophene nucleus which has a lower oxidation potential than thiophene and which is capable of being incorporated into the polymer resulting from the polymerization reaction.

* * * * *